US010312570B2

(12) United States Patent
Wu et al.

(10) Patent No.: US 10,312,570 B2
(45) Date of Patent: Jun. 4, 2019

(54) LONG-DISTANCE RADIO FREQUENCY ANTI-METAL IDENTIFICATION TAG

(71) Applicants: Chi Ju Wu, Taoyuan (TW); Shirl Mei Chang, Taoyuan (TW); Alexander Chan, Taoyuan (TW); Chin Hsien Ting, Taoyuan (TW); Hsi Jui Chan, Taoyuan (TW)

(72) Inventors: Chi Ju Wu, Taoyuan (TW); Shirl Mei Chang, Taoyuan (TW); Alexander Chan, Taoyuan (TW); Chin Hsien Ting, Taoyuan (TW); Hsi Jui Chan, Taoyuan (TW)

(73) Assignee: Read Tag Technology Corp., Taoyuan (TW)

( * ) Notice: Subject to any disclaimer, the term of this patent is extended or adjusted under 35 U.S.C. 154(b) by 131 days.

(21) Appl. No.: 15/693,499

(22) Filed: Sep. 1, 2017

(65) Prior Publication Data

US 2017/0365909 A1    Dec. 21, 2017

(30) Foreign Application Priority Data

Sep. 9, 2016 (TW) .............................. 105129193 A (51) Int. Cl.
*H01Q 13/00* (2006.01)
*H01Q 1/22* (2006.01)
(Continued)

(52) U.S. Cl.
CPC ..... *H01Q 1/2225* (2013.01); *G06K 19/07749* (2013.01); *G06K 19/07771* (2013.01);
(Continued)

(58) Field of Classification Search
CPC ............ H01Q 1/38; H01Q 13/00; H01Q 7/00; H01Q 13/18; G06K 19/07786
(Continued)

(56) References Cited

U.S. PATENT DOCUMENTS

2010/0109848 A1* 5/2010 Blair ...................... A61G 13/10
340/10.2
2011/0198402 A1* 8/2011 Tucker ................ B60C 23/0452
235/492

(Continued)

FOREIGN PATENT DOCUMENTS

TW            201820208       * 11/2016

*Primary Examiner* — Huedung X Mancuso (57) ABSTRACT

A long-distance radio frequency anti-metal identification tag is provided. When a bottom surface of an insulating spacer plate is attached to the surface of a metal object and an electronic tag reading device is used to read a radio frequency identification chip on a second antenna. A resonant cavity is formed between a slot of a first antenna and the surface of the metal object through the isolation of the insulating spacer plate, such that the second antenna located at the position of the resonant cavity resonates with an electromagnetic wave signal reflected on the surface of the metal object by the first antenna. The electromagnetic wave signal is transmitted to the radio frequency identification chip, or the feedback signal of the radio frequency identification chip is transmitted out. The overall UHF electronic tag is resistant to a metal interference and has the performance of long-distance reading.

8 Claims, 8 Drawing Sheets

(51) Int. Cl.
*G06K 19/077* (2006.01)
*H01Q 1/38* (2006.01)
*H01Q 7/00* (2006.01)
*H01Q 13/18* (2006.01)

(52) U.S. Cl.
CPC ......... *G06K 19/07786* (2013.01); *H01Q 1/38* (2013.01); *H01Q 7/00* (2013.01); *H01Q 13/18* (2013.01)

(58) Field of Classification Search
USPC ........................................................ 343/770
See application file for complete search history.

(56) References Cited

U.S. PATENT DOCUMENTS

2014/0073071 A1* 3/2014 Diorio ................ G06K 19/0723
438/26
2017/0346163 A1* 11/2017 Lee ...................... H01Q 1/2283
2018/0261921 A1* 9/2018 Ha ......................... H01Q 1/243

* cited by examiner

LONG-DISTANCE RADIO FREQUENCY ANTI-METAL IDENTIFICATION TAG

FIELD OF THE INVENTION

The present invention relates to a long-distance radio frequency anti-metal identification tag that is resistant to metal interferences and achieves long-distance read effects, meeting the economic benefits.

BACKGROUND OF THE INVENTION

Radio frequency identification (RFID) technology has been widely used in industrial automation, commercial automation, transportation and control management, and many other fields. More and more researches study UHF RFID systems to achieve long-distance, high efficiency, low cost and other characteristics. Because RFID has the advantages of non-contact, low cost, high security and mass production, traditional two-dimensional bar codes are gradually replaced by RFID. These days, radio frequency identification (RFID) is also widely used in identity identification, access control, vehicle management, warehousing logistics, retail, security management, forest management, and many other fields. A common microstrip antenna itself has the shortcomings of narrow frequency, resulting in many restrictions on the antenna design. Most are designed for a single frequency and a narrow frequency response. UHF electronic tags often use printed antennas. The majority are microstrip antennas and printing strip dipoles. This structure is mainly applied to the surfaces of goods, commodities, books and other non-metal objects. If it is applied to metal surfaces, such as metal labels, cars (motorcycle) license plates, power facilities and other fields, the signal is easily reflected to result in abnormal reception. Sometimes, the electronic tag cannot be operated and read. At present, some advanced countries, metal surface electronic tag technology has been developed maturely and has been widely used in various fields of logistics. In other countries, UHF electronic tags are already very popular, but few of the electronic tags are really used for metal surfaces. Taiwan Patent No. I479735 discloses a "long-distance radio frequency identification metal product manufacturing method and structure thereof". Through a metal sheet of the metal product serves as a metal antenna body. The metal antenna body is provided with a resonant cavity to form a metal first antenna. A microstrip loop serves as a metal second antenna. After the preparation of the electronic tag module, the metal second antenna is attached to the metal first antenna and resonates with the resonant cavity. Finally, through the surface of the metal first antenna is processed with anti-interference, so that the internal electronic tag (UHF RFID TAG) of the metal radio frequency identification product can be activated without metal interferences to generate a better field pattern. The effective read distance is up to 10 meters. Although the above-mentioned patent can solve the problem that electronic tags are susceptible to metal interferences and have the effect of long-distance reading and sending signals, however, the preparation of the metal first antenna and the attachment and sealing process of the electronic tag are very complex, and the manufacturing cost is high to affect the population of the products. Accordingly, the inventor of the present invention has devoted himself based on his many years of practical experiences to solve these problems.

SUMMARY OF THE INVENTION

The primary object of the present invention is to provide a long-distance radio frequency anti-metal identification tag, which is an ultra-high frequency electronic tag (UHF TAG). The long-distance radio frequency anti-metal identification tag comprises at least one insulating spacer plate, a first antenna, and a second antenna. The insulating spacer plate is made of a non-conductive insulating material, and has a bottom surface and an upper surface. The first antenna is a conductive foil antenna sheet attached to the upper surface of the insulating spacer plate. The first antenna has a slot near one side edge thereof. A groove is provided between the side edge and the slot. The shape and size of the slot and the width of the groove are configured to adjust the induction frequency band/bandwidth and the induction field pattern of an electromagnetic wave signal. The second antenna is disposed in the slot of the first antenna. The second antenna is a conductive foil antenna loop attached to the upper surface of the insulating spacer plate. Two ends of the loop are electrically connected with a radio frequency identification (RFID) chip. When the bottom surface of the insulating spacer plate is attached to the surface of a metal object and an electronic tag reading device is used to read the radio frequency identification chip on the second antenna. A resonant cavity is formed between the slot of the first antenna and the surface of the metal object through the isolation of the insulating spacer plate, such that the second antenna located at the position of the resonant cavity resonates with the electromagnetic wave signal reflected on the surface of the metal object by the first antenna. The electromagnetic wave signal is transmitted to the radio frequency identification chip, or the feedback signal of the radio frequency identification chip is transmitted out. The overall UHF electronic tag has a simple structure and is resistant to a metal interference and has the performance of long-distance reading.

Preferably, the first antenna and the second antenna are integrally formed on an insulating substrate, and then the insulating substrate is attached to the upper surface of the insulating spacer plate, so that the first and second antennas are fully attached to the upper surface of the insulating spacer plate stably. The insulating substrate is a polymer plastic sheet. The first antenna and the second antenna are formed by etching a metal foil on the surface of the polymer plastic sheet so that the first and second antennas can be easily manufactured by the circuit process of a general PC circuit board.

Preferably, the insulating spacer plate is made of a flexible insulating material. The insulating spacer plate is flexible so that the UHF electronic tag can be used on the curved surface of the metal object.

Preferably, the slot of the first antenna is a 凸-shaped slot. The slot has a wide slot portion for accommodating the second antenna and a narrow slot portion. The groove is disposed between the narrow slot portion and the side edge. Through the 凸-shaped slot and the width of the groove of the first antenna to match the induction field pattern of the electromagnetic wave signal reflected on the surface of the metal object and to adjust the frequency band and bandwidth of the electromagnetic wave signal. The UHF electronic tag attached to the surface of the metal object for identification can achieve high sensitivity and long-distance reading effects in the frequency band to be used.

Preferably, the bottom surface of the insulating spacer plate is provided with a double-sided adhesive layer, and a release paper is provided on the double-sided adhesive layer. Only the release paper is torn from the bottom surface of the insulating spacer plate, so that the double-sided adhesive layer can be secured and attached to the surface of any object. In this way, the ultra high frequency electronic tag can be easily attached to the surfaces of a variety of metal objects for use.

Preferably, the bottom surface of the insulating spacer plate is provided with a conductive foil. A resonant cavity is formed between the slot of the first antenna and the conductive foil through the isolation of the insulating spacer plate. The surface of the conductive foil is attached to or in contact with the surface of the metal object, so that the first antenna senses the resonance of the electromagnetic wave signal from the conductive foil to ensure that the UHF electronic attached to various metal objects has a long-distance effective reading. An outer surface of the conductive foil is provided with a double-sided adhesive layer, and a release paper is provided on the double-sided adhesive layer. Only the release paper is torn from the outer surface of the conductive foil. The conductive foil can be easily bonded to the surface of the metal object by means of the double-sided adhesive layer having adhesive.

DETAILED DESCRIPTION OF THE PREFERRED EMBODIMENTS

Embodiments of the present invention will now be described, by way of example only, with reference to the accompanying drawings.

Figure 1:
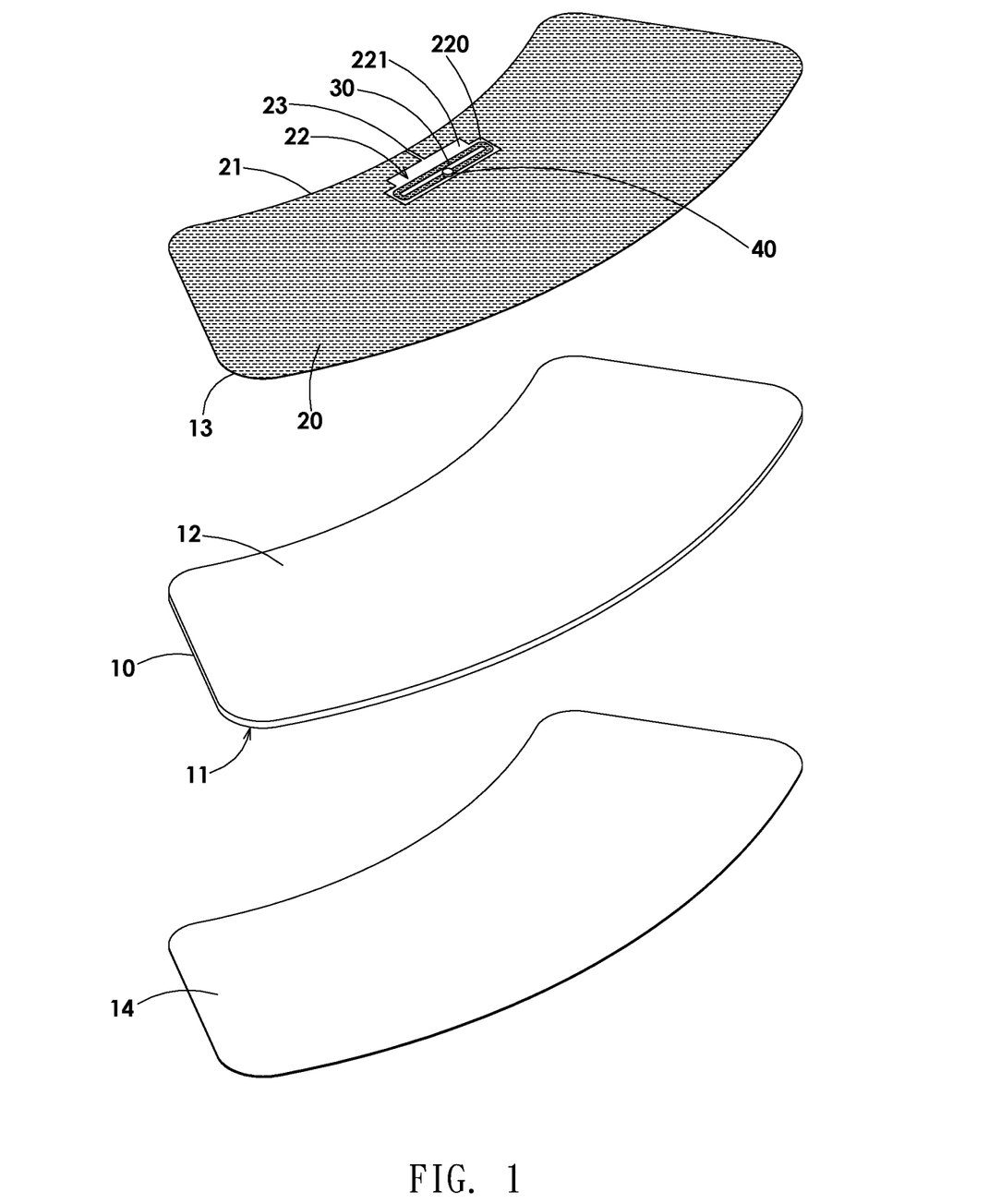
FIG. 1 is an exploded view in accordance with a first embodiment of the present invention.
Figure 2:
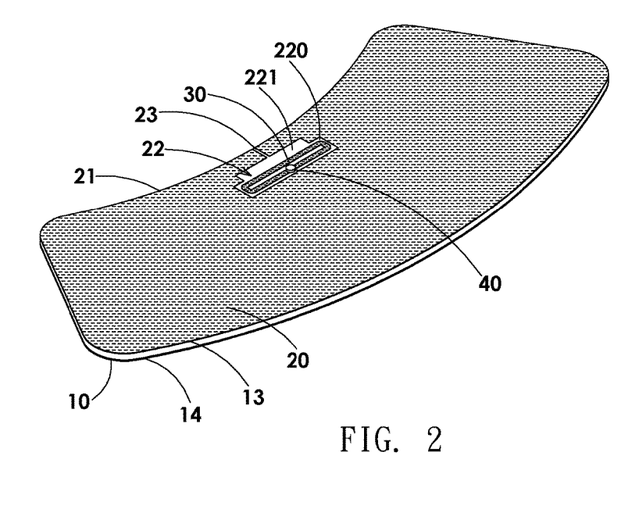
FIG. 2 is a perspective view in accordance with the first embodiment of the present invention.
Figure 3:
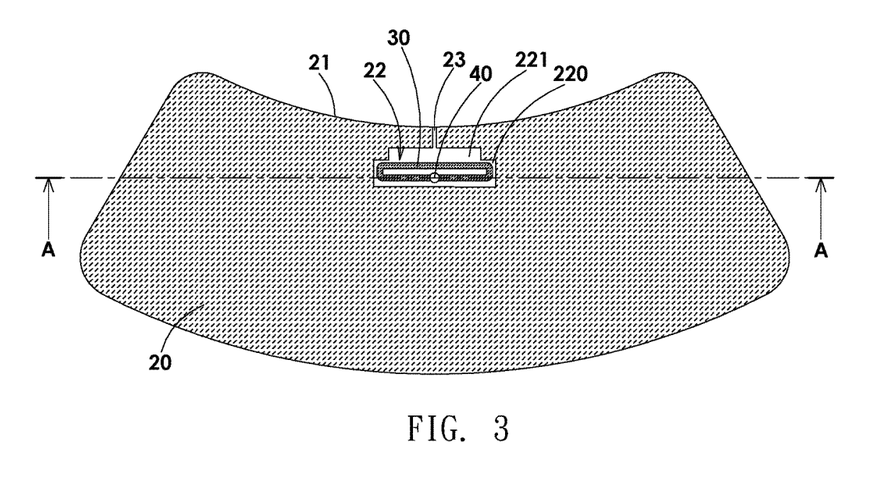
FIG. 3 is a top view in accordance with the first embodiment of the present invention.
Figure 7:
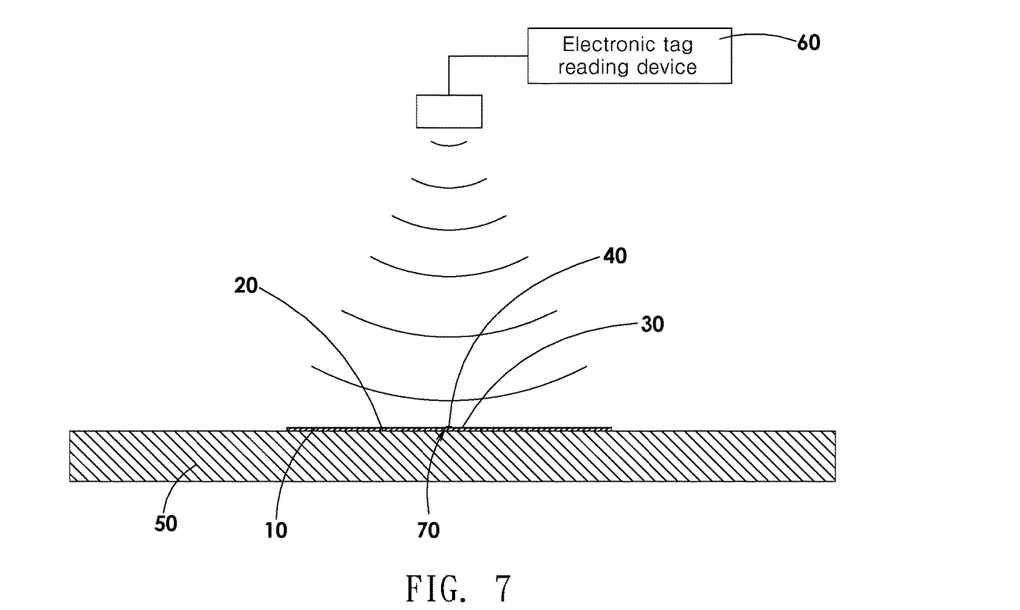
FIG. 7 is a schematic view in accordance with the first embodiment of the present invention attached to the surface of the metal object and read by the electronic tag reading device.
Figure 8:
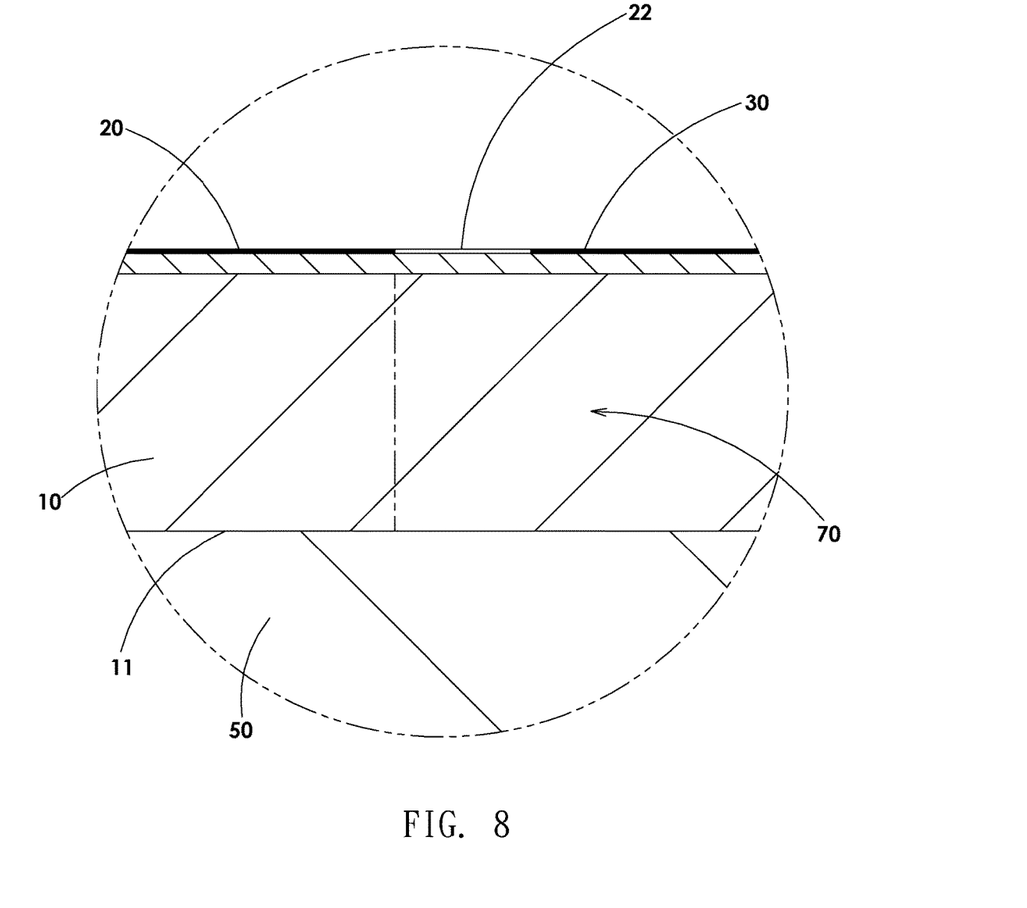
FIG. 8 is an enlarged view in accordance with the first embodiment of the present invention attached to the surface of the metal object.

A long-distance radio frequency anti-metal identification tag, as shown in FIGS. 1-5, is an ultra high frequency electronic tag (UHF TAG), and comprises at least one insulating spacer plate 10, a first antenna 20, and a second antenna 30. The insulating spacer plate 10 is made of a non-metal non-conductive insulating material and has a bottom surface 11 and an upper surface 12. The first antenna 20 is a metal or non-metal conductive foil antenna sheet attached to the upper surface 12 of the insulating spacer plate 10. The first antenna 20 has a slot 22 near one side edge 21 thereof. A groove 23 is provided between the side edge 21 and the slot 22. The shape and size of the slot 22 and the width of the groove 23 are configured to adjust the induction frequency band/bandwidth and the induction field pattern of an electromagnetic wave signal. The second antenna 30 is disposed in the slot 22 of the first antenna 20, not in contact with the first antenna 20. The second antenna 30 is a metal or non-metal conductive foil antenna loop attached to the upper surface 12 of the insulating spacer plate 10. Two ends of the conductive foil antenna loop are electrically connected with a radio frequency identification (RFID) chip 40. As shown in FIGS. 3, 7, 8, when the bottom surface 11 of the insulating spacer plate 10 is attached to the surface of a metal object 50 and an electronic tag reading device 60 is used to read the radio frequency identification chip 40 on the second antenna 30, a resonant cavity 70 is formed between the slot 22 of the first antenna 20 and the surface of the metal object 50 through the isolation of the insulating spacer plate 10, such that the second antenna 30 located at the position of the resonant cavity 70 resonates with the electromagnetic wave signal reflected on the surface of the metal object 50 by the first antenna 20. The electromagnetic wave signal is transmitted to the radio frequency identification chip 40, or the feedback signal of the radio frequency identification chip 40 is transmitted out. The overall UHF electronic tag has a simple structure and is resistant to a metal interference and has the performance of long-distance read range.

Figure 4:
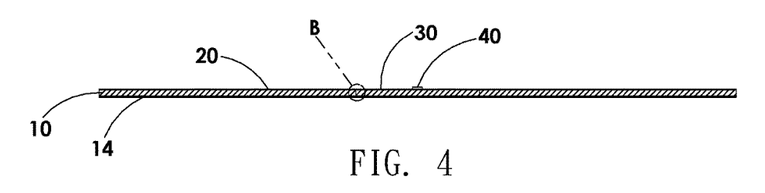
FIG. 4 is a sectional view taken along line A-A of FIG. 3.
Figure 5:
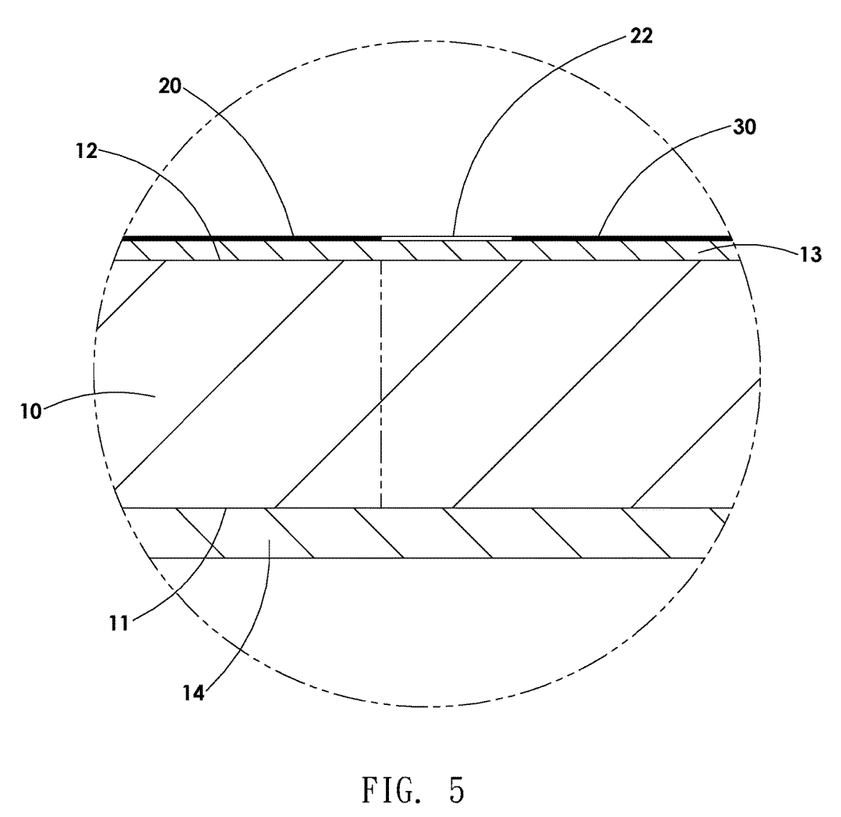
FIG. 5 is an enlarged view of circle B of FIG. 4.

According to the above-described embodiment, as shown in FIGS. 1, 4 and 5, the first antenna 20 and the second antenna 30 are integrally formed on an insulating substrate 13, and then the insulating substrate 13 is attached to the upper surface 12 of the insulating spacer plate 10, so that the first and second antennas 20, 30 are fully attached to the upper surface 12 of the insulating spacer plate 10 stably (not easily broken). As shown in FIGS. 1, 4 and 5, the insulating substrate 13 is a polyimide (PI) or polyethylene terephthalate (PET) polymer plastic sheet. The first antenna 20 and the second antenna 30 are formed by etching a copper or aluminum metal foil on the surface of the polymer plastic sheet so that the first and second antennas 20, 30 can be easily manufactured by the circuit process of a general PC circuit board.

According to the above-described embodiment, as shown in FIGS. 1, 2, 4 and 5, the insulating spacer plate 10 is made of a flexible polymeric plastic insulating material or a rubber (for example, silica gel). The insulating spacer plate 10 is flexible so that the UHF electronic tag can be used on the curved surface of the metal object (not shown).

According to the above-described embodiment, as shown in FIGS. 1, 2 and 3, the slot 22 of the first antenna 20 is a 凸-shaped slot. The slot 22 has a wide slot portion 220 for accommodating the second antenna 30 and a narrow slot portion 221. The groove 23 is disposed between the narrow slot portion 221 and the side edge 21. As shown in FIGS. 3, 7 and 8, through the L-shaped slot 22 and the width of the groove 23 of the first antenna 20 to match the induction field pattern of the electromagnetic wave signal reflected on the surface of the metal object 50 and to adjust the frequency band and bandwidth of the electromagnetic wave signal, the UHF electronic tag attached to the surface of the metal object 50 for identification can achieve high sensitivity and long-distance read range in the frequency band to be used. That is, most countries or regions will regulate the frequency band for the use of the electronic tags (RFID TAG). For example, in Taiwan, the frequency band is in the range of 920-930 MHZ. The ultra high frequency electronic tag attached to the surface of the metal object is tested for a read distance in the frequency band of 800 MHz-1000 MHz by the Finnish Voyntic Tagformance Lite Measurement System (UHF RFID), as shown in the test report of Annex I. The test report confirms that the effective read distance of the ultra high frequency electronic tag attached to an aluminum plate surface is up to 13 meters. It is apparent that the ultra high frequency electronic tag of the present invention has excellent performances for long-distance reading in commercial use.

Figure 6:
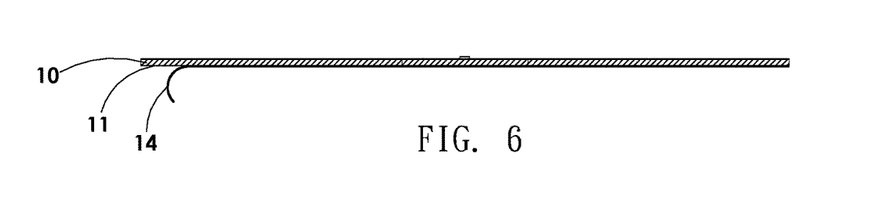
FIG. 6 is a sectional view of the insulating spacer plate in accordance with the first embodiment of the present invention, showing that the release paper is torn from the bottom surface of the insulating spacer plate.

According to the above-described embodiment, as shown in FIGS. 1, 2, 4 and 5, the bottom surface 11 of the insulating spacer plate 10 is provided with a double-sided adhesive layer (not shown), and a release paper 14 is provided on the double-sided adhesive layer. As shown in FIGS. 6 and 7, only the release paper 14 is torn from the bottom surface 11 of the insulating spacer plate 10, so that the double-sided adhesive layer can be fixed and attached to the surface of any object. In this way, the ultra high frequency electronic tag can be easily attached to the surfaces of a variety of metal objects for use.

Figure 9:
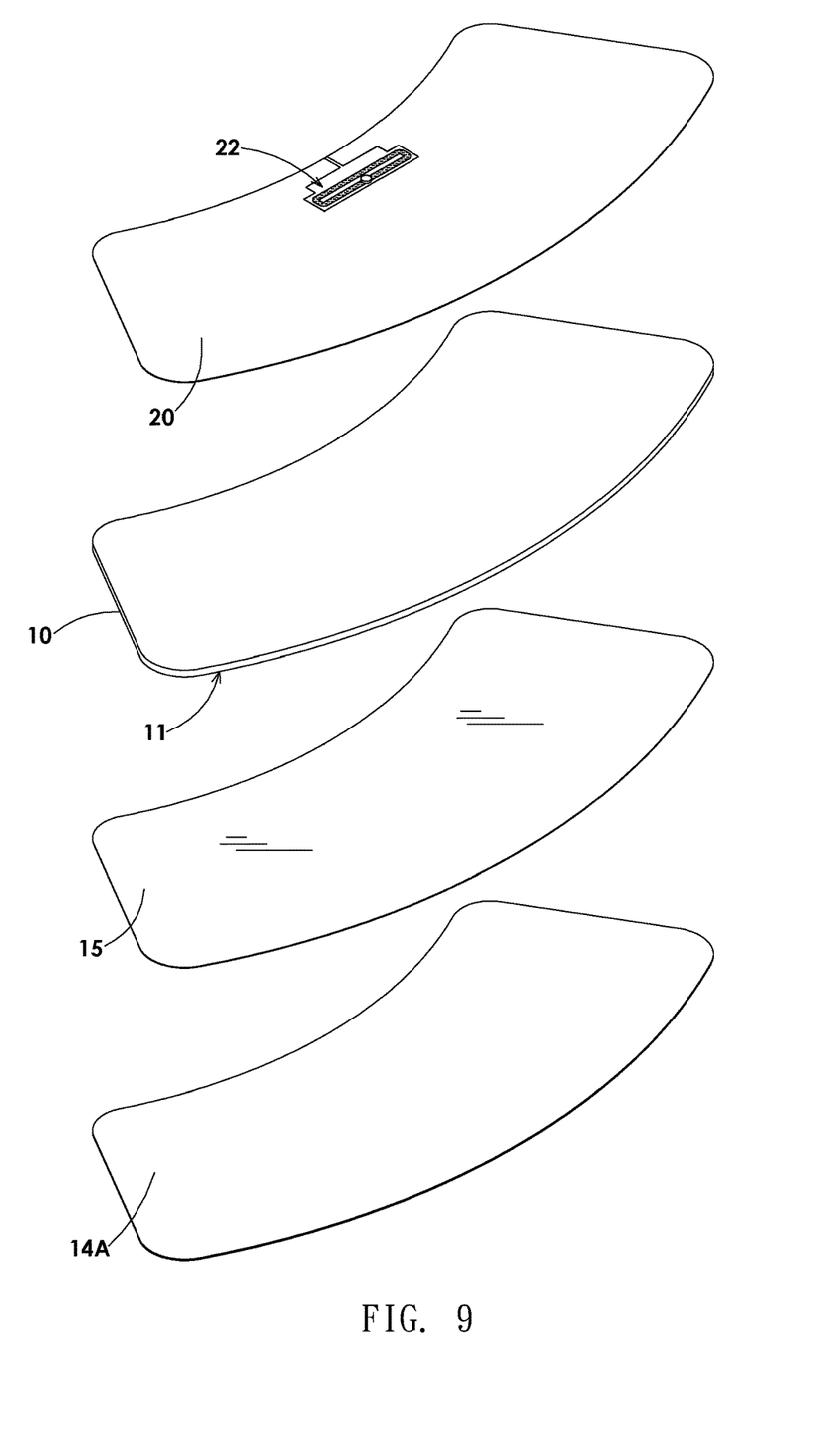
FIG. 9 is an exploded view in accordance with a second embodiment of the present invention.
Figure 10:
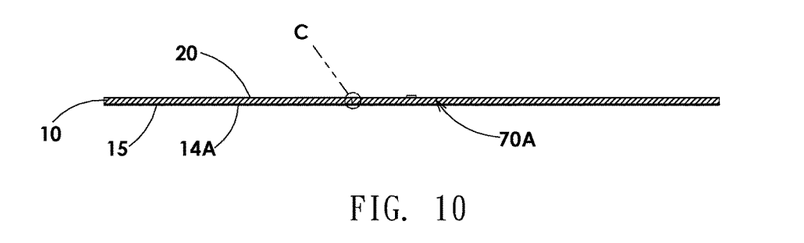
FIG. 10 is a sectional view in accordance with the second embodiment of the present invention.
Figure 11:
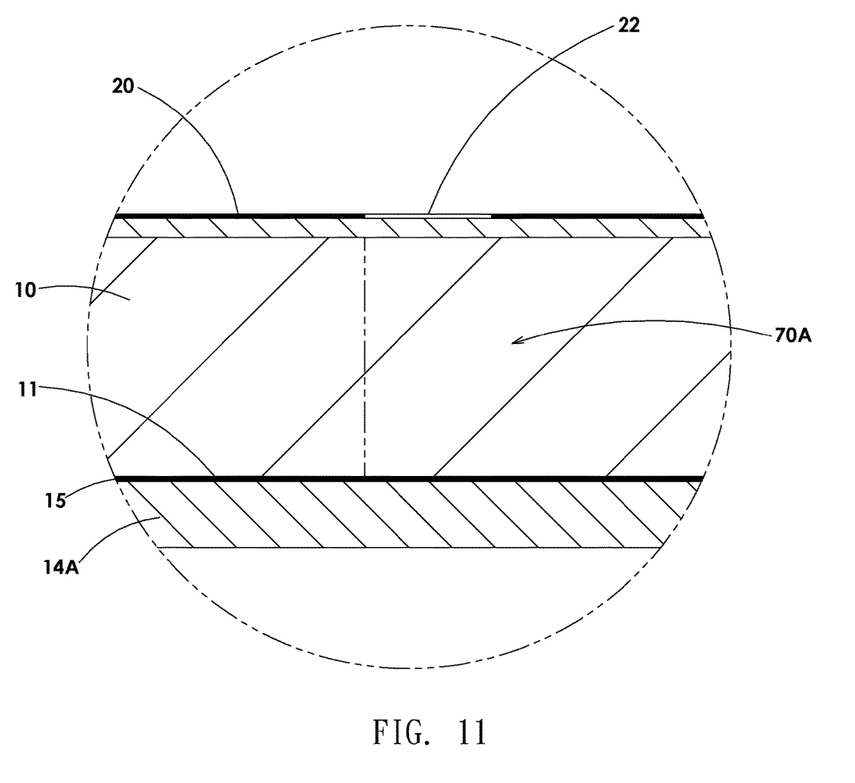
FIG. 11 is an enlarged view of circle C of FIG. 10.
Figure 12:
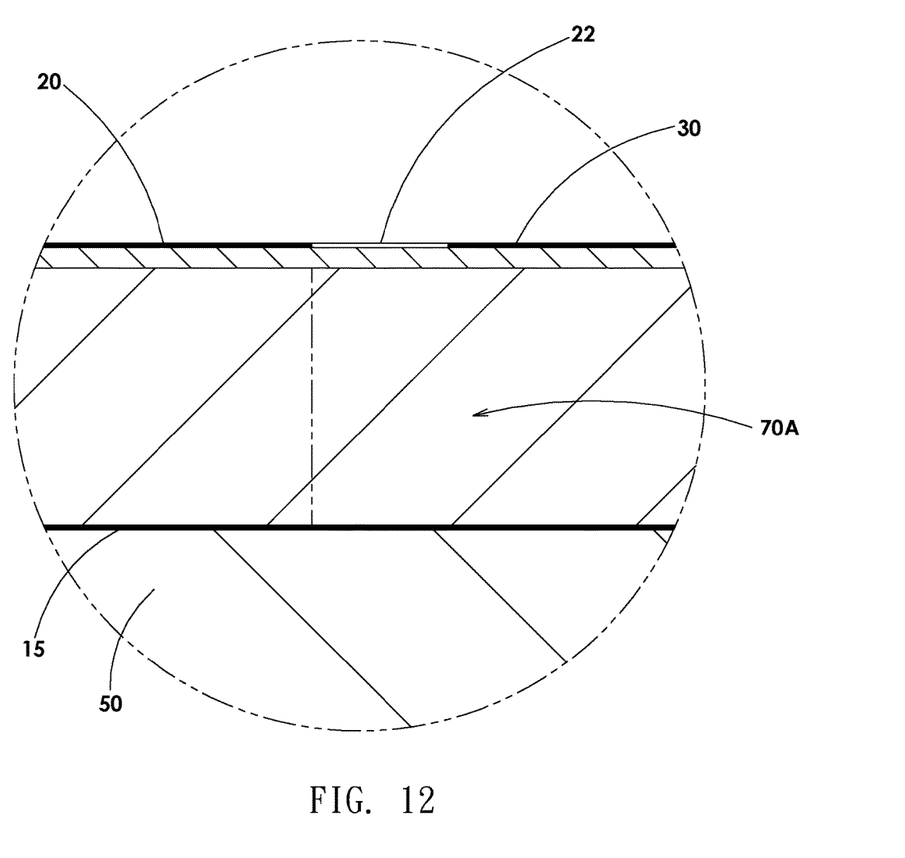
FIG. 12 is an enlarged view in accordance with the second embodiment of the present invention attached to the surface of the metal object.

According to the above-described embodiment, as shown in FIGS. 9, 10, 11, the bottom surface 11 of the insulating spacer plate 10 is provided with a conductive foil 15 (which may be a copper foil or an aluminum foil). A resonant cavity 70A is formed between the slot 22 of the first antenna 20 and the conductive foil 15 through the isolation of the insulating spacer plate 10. As shown in FIG. 12, the surface of the conductive foil 15 is attached to or in contact with the surface of the metal object 50, so that the first antenna 20 senses the resonance of the electromagnetic wave signal from the conductive foil 15 to ensure that the UHF electronic attached to various metal objects 50 has a long-distance effective read range.

As shown in FIGS. 9, 10, 11, an outer surface of the conductive foil 15 is provided with a double-sided adhesive layer (not shown), and a release paper 14A is provided on the double-sided adhesive layer. Only the release paper 14A is torn from the outer surface of the conductive foil 15 (same as FIG. 6). As shown in FIG. 12, the conductive foil 15 can be easily bonded to the surface of the metal object 50 by means of the double-sided adhesive layer having adhesive.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A long-distance radio frequency anti-metal identification tag, being an ultra high frequency electronic tag and comprising at least one insulating spacer plate, a first antenna, and a second antenna; the insulating spacer plate being made of a non-conductive insulating material and having a bottom surface and an upper surface; the first antenna being a conductive foil antenna sheet attached to the upper surface of the insulating spacer plate, the first antenna having a slot near one side edge thereof, a groove being provided between the side edge and the slot; the second antenna being disposed in the slot of the first antenna, the second antenna being a conductive foil antenna loop attached to the upper surface of the insulating spacer plate, two ends of the conductive foil antenna loop being electrically connected with a radio frequency identification chip.

2. The long-distance radio frequency anti-metal identification tag as claimed in claim 1, wherein the first antenna and the second antenna are integrally formed on an insulating substrate, and the insulating substrate is attached to the upper surface of the insulating spacer plate.

3. The long-distance radio frequency anti-metal identification tag as claimed in claim 2, wherein the insulating substrate is a polymer plastic sheet, and the first antenna and the second antenna are formed by etching a metal foil on a surface of the polymer plastic sheet.

4. The long-distance radio frequency anti-metal identification tag as claimed in claim 1, wherein the insulating spacer plate is made of a flexible insulating material.

5. The long-distance radio frequency anti-metal identification tag as claimed in claim 1, wherein the slot of the first antenna is a 凸-shaped slot, the slot has a wide slot portion for accommodating the second antenna and a narrow slot portion, and the groove is disposed between the narrow slot portion and the side edge.

6. The long-distance radio frequency anti-metal identification tag as claimed in claim 1, wherein the bottom surface of the insulating spacer plate is provided with a double-sided adhesive layer, and a release paper is provided on the double-sided adhesive layer.

7. The long-distance radio frequency anti-metal identification tag as claimed in claim 1, wherein the bottom surface of the insulating spacer plate is provided with a conductive foil.

8. The long-distance radio frequency anti-metal identification tag as claimed in claim 7, wherein an outer surface of the conductive foil is provided with a double-sided adhesive layer, and a release paper is provided on the double-sided adhesive layer.

* * * * *